(12) United States Patent
Ozawa

(10) Patent No.: US 10,270,921 B2
(45) Date of Patent: Apr. 23, 2019

(54) IMAGE ANALYZING APPARATUS DETERMINING REPRESENTATION FORM OF CODE IMAGE USING DISTANCES OF CODE ELEMENTS

(71) Applicant: BROTHER KOGYO KABUSHIKI KAISHA, Nagoya, Aichi (JP)

(72) Inventor: Ryohei Ozawa, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 129 days.

(21) Appl. No.: 15/364,315

(22) Filed: Nov. 30, 2016

(65) Prior Publication Data

US 2017/0155779 A1 Jun. 1, 2017

(30) Foreign Application Priority Data

Nov. 30, 2015 (JP) ................................. 2015-233432

(51) Int. Cl.
| | |
|---|---|
| G06K 7/14 | (2006.01) |
| G06K 9/32 | (2006.01) |
| G06K 9/46 | (2006.01) |
| H04N 1/00 | (2006.01) |
| H04N 1/32 | (2006.01) |

(52) U.S. Cl.
CPC .......... *H04N 1/00336* (2013.01); *G06K 7/14* (2013.01); *G06K 9/3275* (2013.01); *G06K 9/4638* (2013.01); *H04N 1/32352* (2013.01); H04N 2201/3269 (2013.01)

(58) Field of Classification Search
CPC ............. H04N 1/00336; G06K 9/4638; G06K 7/10821; G06K 7/1413; G06K 7/1443; G06K 7/1447; G06K 7/1473; G06K 7/1486

USPC ......................................................... 382/199
See application file for complete search history.

(56) References Cited

U.S. PATENT DOCUMENTS

| | | | |
|---|---|---|---|
| 2006/0180669 A1* | 8/2006 | Hara ........................ | G06K 7/10 235/462.07 |
| 2011/0068173 A1* | 3/2011 | Powers .................... | G06K 7/14 235/462.06 |

FOREIGN PATENT DOCUMENTS

| | | |
|---|---|---|
| JP | S62-84391 A | 4/1987 |
| JP | H07-220081 A | 8/1995 |
| JP | 2002-044318 A | 2/2002 |

* cited by examiner

*Primary Examiner* — Menatoallah Youssef
(74) *Attorney, Agent, or Firm* — Scully, Scott, Murphy & Presser, P.C.

(57) ABSTRACT

In an image analyzing apparatus, a controller acquires target image data representing a target image having a code image. The code image includes N number of code elements arranged in a first direction. N is an integer equal to or greater than 2. Each of the N number of code elements has two first sides parallel to a second direction orthogonal to the first direction. The controller specifies outline pixels configuring respective outlines of the respective N number of code elements from. The controller specifies a target inclination by analyzing the outline pixels. The target inclination indicates an inclination of the N number of code elements in the target image. The controller specifies a distance between two first sides of each of N number of code elements. The controller determines a representation form of the code image using the distances.

12 Claims, 11 Drawing Sheets

$D_1$ (BLACK) = $r_2 - r_1$ → RECTANGLE (LARGE)

$D_2$ (WHITE) = $r_3 - r_2$ → BLANK SPACE $D_3$ (BLACK) = $r_4 - r_3$ → RECTANGLE (LARGE)

$D_4$ (WHITE) = $r_5 - r_4$ → BLANK SPACE $D_5$ (BLACK) = $r_6 - r_5$ → RECTANGLE (SMALL)

$D_6$ (WHITE) = $r_7 - r_6$ → BLANK SPACE $D_7$ (BLACK) = $r_8 - r_7$ → RECTANGLE (SMALL)

↓

DETERMINE ARRANGEMENT PATTERN P1

FIG.11
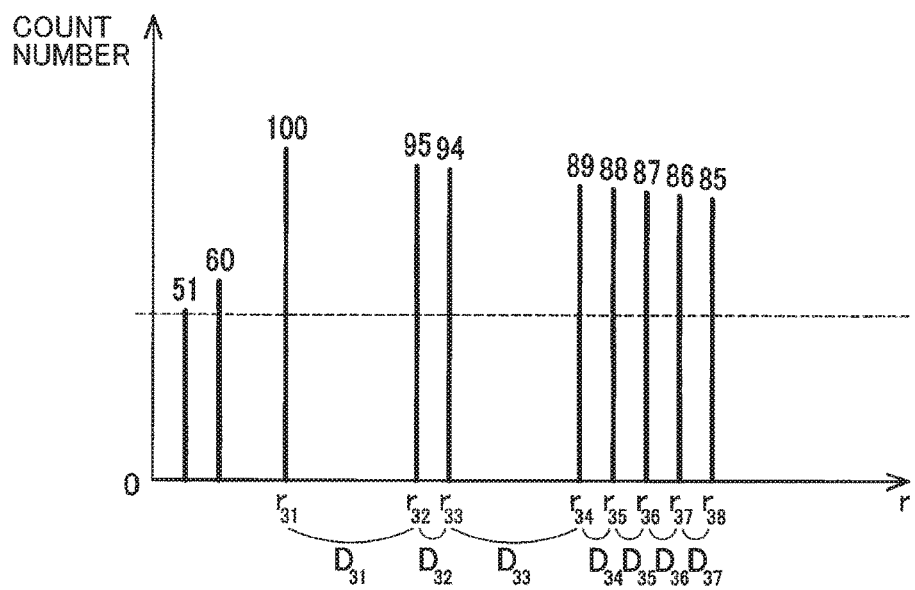
$D_{31}$(BLACK)= $r_{32}-r_{31}$ →RECTANGLE (LARGE)
$D_{32}$(WHITE) = $r_{33}-r_{32}$ →BLANK SPACE
$D_{33}$(BLACK)= $r_{34}-r_{33}$ →RECTANGLE (LARGE)
$D_{34}$(WHITE) = $r_{35}-r_{34}$ →BLANK SPACE
$D_{35}$(BLACK)= $r_{36}-r_{35}$ →RECTANGLE (SMALL)
$D_{36}$(WHITE) = $r_{37}-r_{36}$ →BLANK SPACE
$D_{37}$(BLACK)= $r_{38}-r_{37}$ →RECTANGLE (SMALL)
DETERMINE ARRANGEMENT PATTERN P1
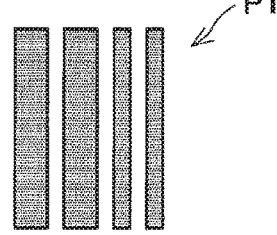

IMAGE ANALYZING APPARATUS DETERMINING REPRESENTATION FORM OF CODE IMAGE USING DISTANCES OF CODE ELEMENTS

CROSS REFERENCE TO RELATED APPLICATION

This application claims priority from Japanese Patent Application No. 2015-233432 filed Nov. 30, 2015. The entire content of the priority application is incorporated herein by reference.

TECHNICAL FIELD

The present disclosure relates to an image analyzing apparatus for analyzing code image included in a target image.

BACKGROUND

There is known a scanner that detects a patch code including a plurality of types of quadrangles having different widths each other. When one sheet includes a patch code among the plurality of document sheets, the scanner divides scan data successively representing the plurality of document sheets by data for one sheet including the patch code. When the sheet of documents does not includes the patch code, the scanner does not perform such division or classification process.

SUMMARY

The conventional technique does not consider the possibility that the document is printed in a state where the patch code is tilted. Further, there is a possibility that the patch code is not tilted in a document but the document itself is tilted when scanned. In such cases, the patch code is tilted in the scanned image, and thus there is a possibility that the scanner cannot detect the patch code accurately.

In view of the foregoing, it is an object of the present disclosure to provide technique to accurately determine a form of a code image, such as a patch code, even if the code image is tilted in a target image.

In order to attain the above and other objects, the disclosure provides an image analyzing apparatus. The image analyzing apparatus includes a controller configured to perform: acquiring target image data representing a target image having a code image, the code image including N number of code elements arranged in a first direction where N is an integer equal to or greater than 2, each of the N number of code elements having two first sides parallel to a second direction orthogonal to the first direction, the target image data having a plurality of target image pixels; specifying outline pixels configuring respective outlines of the respective N number of code elements from among the plurality of target image pixels; specifying a target inclination by analyzing the outline pixels, the target inclination indicating an inclination of the N number of code elements in the target image; specifying N number sets of two target straight lines for the respective N number of code elements using the outline pixels and the target inclination, each of the N number sets of two target straight lines corresponding to two first sides of corresponding one of the N number code elements; specifying first distances for the respective N number of code elements by specifying second distances for the respective N number sets of two target straight lines, each of the first distances being between two first sides included in corresponding one of the N number of code elements, each of the second distances being between corresponding one set among the N number sets of two target straight lines; and determining a representation form of the code image using the first distances for the respective N number of code elements.

According to another aspects, the disclosure provides a non-transitory computer readable storage medium storing a set of program instructions installed on and executed by a computer. The set of program instructions includes: acquiring target image data representing a target image having a code image, the code image including N number of code elements arranged in a first direction where N is an integer equal to or greater than 2, each of the N number of code elements having two first sides parallel to a second direction orthogonal to the first direction, the target image data having a plurality of target image pixels; specifying outline pixels configuring respective outlines of the respective N number of code elements from among the plurality of target image pixels; specifying a target inclination by analyzing the outline pixels, the target inclination indicating an inclination of the N number of code elements in the target image; specifying N number sets of two target straight lines for the respective N number of code elements using the outline pixels and the target inclination, each of the N number sets of two target straight lines corresponding to two first sides of corresponding one of the N number code elements; specifying first distances for the respective N number of code elements by specifying second distances for the respective N number sets of two target straight lines, each of the first distances being between two first sides included in corresponding one of the N number of code elements, each of the second distances being between corresponding one set among the N number sets of two target straight lines; and determining a representation form of the code image using the first distances for the respective N number of code elements.

BRIEF DESCRIPTION OF THE DRAWINGS

The particular features and advantages of the disclosure as well as other objects will become apparent from the following description taken in connection with the accompanying drawings, in which:

FIG. 11 is an explanatory diagram illustrating an example when determining an arrangement pattern for the original document shown in FIG. 10.

Figure 1:
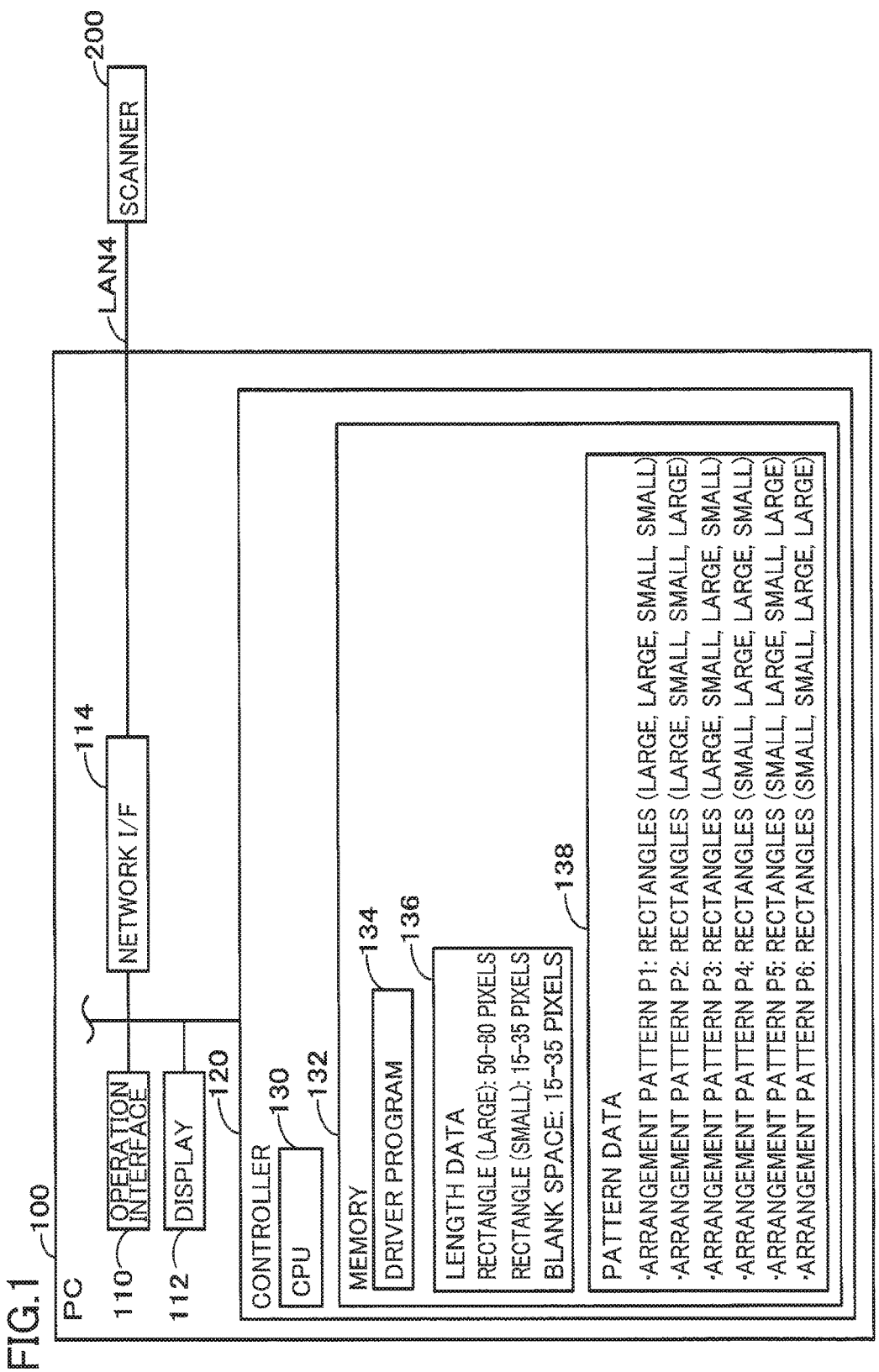
FIG. 1 is a block diagram illustrating an entire configuration of a communication system according to an embodiment.

DETAILED DESCRIPTION (Configurations of Communication System 2, FIG. 1)

As shown in FIG. 1, a communication system 2 includes a PC (Personal Computer) 100 and a scanner 200. The PC 100 and the scanner 200 can communicate with each other via a LAN (Local Area Network) 4.

(Configurations of PC 100)

The PC 100 includes an operation interface (I/F) 110, a display 112, a network interface (I/F) 114, and a controller 120. The operation interface 110 includes a mouse, and a keyboard. The user can input various instructions to the PC 100 by operating the operation interface 110. The display 112 displays various information. The network interface 114 is connected to the LAN 4.

The controller 120 includes a CPU 130 and a memory 132. The CPU 130 is a processor that executes various processes (for example, a process shown in FIG. 3) according to various programs stored in the memory 132. The various programs, for example, are programs of an Operating System (OS), and a driver program 134. The driver program 134 is provided by a vender of the scanner 200, and a program for executing various processes concerning the scanner 200. For example, the driver program 134 may be installed on the PC 100 from a computer-readable media shipped with the scanner 200, or may be installed on the PC 100 via a server (not shown) provided by the vender of the scanner 200 through Internet.

The memory 132 includes a ROM (Read Only Memory) and a RAM (Random Access Memory), and etc. The memory 132 stores length data 136, and pattern data 138 as well as the driver program 134. The length data 136 indicates lengths concerning patch codes PC (FIG. 2).

Each patch code PC is configured by four rectangular images. The pattern data 138 indicates arrangement patterns P1-P6 of the four rectangular images (that is, six types of patch codes PC). The memory 132 further stores six types of folders (not shown) respectively corresponding to the six types of patch codes PC. When the CPU 130 receives original document image data from the scanner 200, the CPU 130 can store the original document image data into one of the six folders.

(Configurations of Scanner 200)

Figure 2:
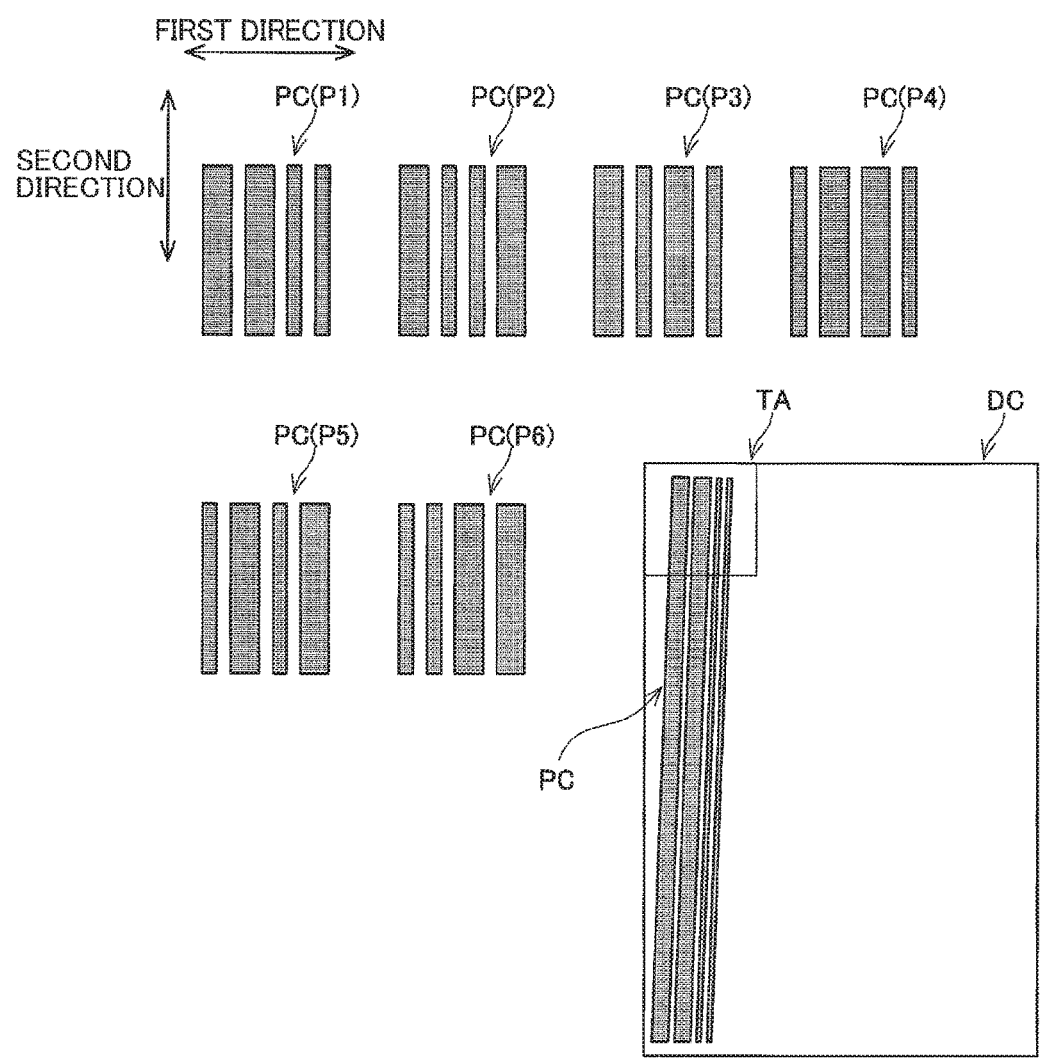
FIG. 2 is an explanatory diagram illustrating six types of arrangement patterns of patch codes.

The scanner 200 is a peripheral apparatus of the PC 100 capable of executing scanning function for generating the original document image data by scanning an original document DC (FIG. 2). For example, the scanner 200 can store the original document image data in a memory therein. The scanner 200 provides the original document image data to the PC 100 allowing the PC 100 to store the original document image data, or allowing the PC 100 to execute an image process on the original document image data.

The scanner 200 is connected to the LAN 4. The scanner 200 includes a FB (Flat Bed) mechanism (not shown) and an ADF (Auto Document Feeder) mechanism (not shown). The FB mechanism includes a transparent plate and a plurality of optical elements arranged in an arrangement direction. Each optical element may be a CCD (Charge Coupled Device) sensor or a CIS (Contact Image Sensor). The plurality of optical elements can move in an orthogonal direction orthogonal to the arrangement direction. Using the FB mechanism, the original document DC can be scanned without moving the original document DC on the transparent plate while moving the plurality of optical elements in the orthogonal direction. The ADF mechanism can convey the original document DC in the orthogonal direction. Using the ADF mechanism, the original document DC can be scanned without moving the plurality of optical elements while conveying the original document DC in the orthogonal direction.

(Arrangement Patterns of Patch Codes PC, FIG. 2)

The patch codes PC will be explained referring to FIG. 2. Each patch code PC includes two large rectangles and two small rectangles smaller than the large rectangles. Hereinafter, each large rectangle is referred to as the rectangle (large), and each small rectangle is referred to as the rectangle (small). Each rectangle (large) has two longitudinal sides and two short sides. Each rectangle (small) includes two longitudinal sides and two short sides. The short side of each rectangle (large) is relatively large to that of each rectangle (small). In other words, the short side of each rectangle (small) is relatively short to that of each rectangle (large). The longitudinal side of each rectangle (large) is equal to that of each rectangle (small). The six types of patch codes PC are distinguished depending on arrangement of four rectangles. A single color (black color in the embodiment) is used on and inside of outlines of all rectangles.

The original document DC with the patch code PC is generated by printing the patch code PC on a recording sheet. The original document DC may include one or plural sheets. The patch code DC may be printed on a part of one sheet on which contents of the original document DC, e.g., text, graph, are printed. Alternatively, the patch code DC may be printed on one sheet, which may be a cover page, and contents of the original document DC may be printed on pages following the cover page. When the original document DC is scanned by the scanner 200, the original document image data representing the original document image(s) is generated. The original document image includes a patch code image PCI (FIG. 4) having the patch code PC. When the original document image data is analyzed by the PC 100, a type of the patch code PC in the patch code image PCI is detected The PC 100 executes a process depending on the detected type of the patch code PC. That is, each patch code PC is an image allowing the PC 100 to perform the process depending on the type thereof.

More specifically, the type of patch code PC corresponds to one of the folders in the PC 100 in which the original document image data should be stored. The user previously registers, in the PC 100, correlation data that correlates each folder in the PC 100 with a corresponding type of the patch code PC. When the user wishes to the original document image data to be stored in the specific folder, the user instructs a printer (not shown) to print an image (original document image) added with the specific type of the patch code PC corresponding to the specific folder by using a terminal (the PC 100, for example). Accordingly, the original document DC added with the specific type of the patch code PC is generated. Next, the user instructs the scanner 200 to scan the original document DC using the driver program 134. Accordingly, the scanner 200 provides the original document image data to the PC 100, the PC 100 analyzes the original document image data and detects the specific type of the patch code PC. In this case, the PC 100 stores the original document image data in the specific folder of the memory 132.

As shown in FIG. 2, each patch code PC is arranged and printed along a left longitudinal side of the original document DC. There is a possibility that when the original document DC is generated by printing the patch code PC on a recording sheet, the printed patch code PC is tilted from the recording sheet. In this case, a direction in which the longitudinal side of the patch code PC extends does not match a direction in which the longitudinal side of the document DC extends. That is, the patch code PC is tilted in the original document DC. In the embodiment, the PC 100 can properly detect the type of the patch code PC even if the patch code PC is tilted in the original document DC.

FIG. 2 shows arrangement patterns P1-P6 of the respective six patch codes PC. Note that an aspect ratio of each patch code PC is differently shown in FIG. 2 from an actual aspect ratio of the patch codes PC. For example, the arrangement pattern P1 is a pattern in which the rectangle (large), the rectangle (large), the rectangle (small), the rectangle (small) appear (or, are arranged) in this order from the left side. The arrangement pattern P2 is a pattern in which the rectangle (large), the rectangle (small), the rectangle (small), the rectangle (large) appear (or, are arranged) in this order from the left side. The remaining arrangement patterns P3-P6 are defined similarly to the arrangement patterns P1 and P2.

In each patch code PC, four rectangles extend in a specific direction and are arranged in parallel. Hereinafter, a direction in which the four rectangles are arranged is referred to as a "first direction", and a direction orthogonal to the first direction is referred to as a "second direction". Each rectangle includes two short sides extending parallel to the first direction and two longitudinal sides extending parallel to the second direction. The length of the short side of the rectangle (large) is between 4.75 mm and 5.25 mm. The length of the short side of the rectangle (small) is between 1.78 mm and 2.28 mm. The patch code includes a blank space between two neighboring rectangles. The length of the blank space (referred to as a "blank space length") is between 1.78 mm and 2.28 mm.

The length data 136 in the memory 132 (FIG. 1) includes the length of the short side of the rectangle (large), the length of the short side of the rectangle (small), and the blank space length. Note that the length data 136 does not include data indicating a length of the longitudinal side of the rectangle (large) and a length of longitudinal side of the rectangle (small). In the length data 136, each length is defined by number of pixels in an image having a prescribed resolution (300 dpi in the embodiment). Here, the number of pixel is converted from the actual length (that is, a length defined by millimeter (mm)). Specifically, in the length data 136, the lengths of the short sides of the rectangle (large) and the rectangle (small), and the blank space length are respectively 50-80 pixels, 15-35 pixels, and 15-35 pixels.

Figure 3:
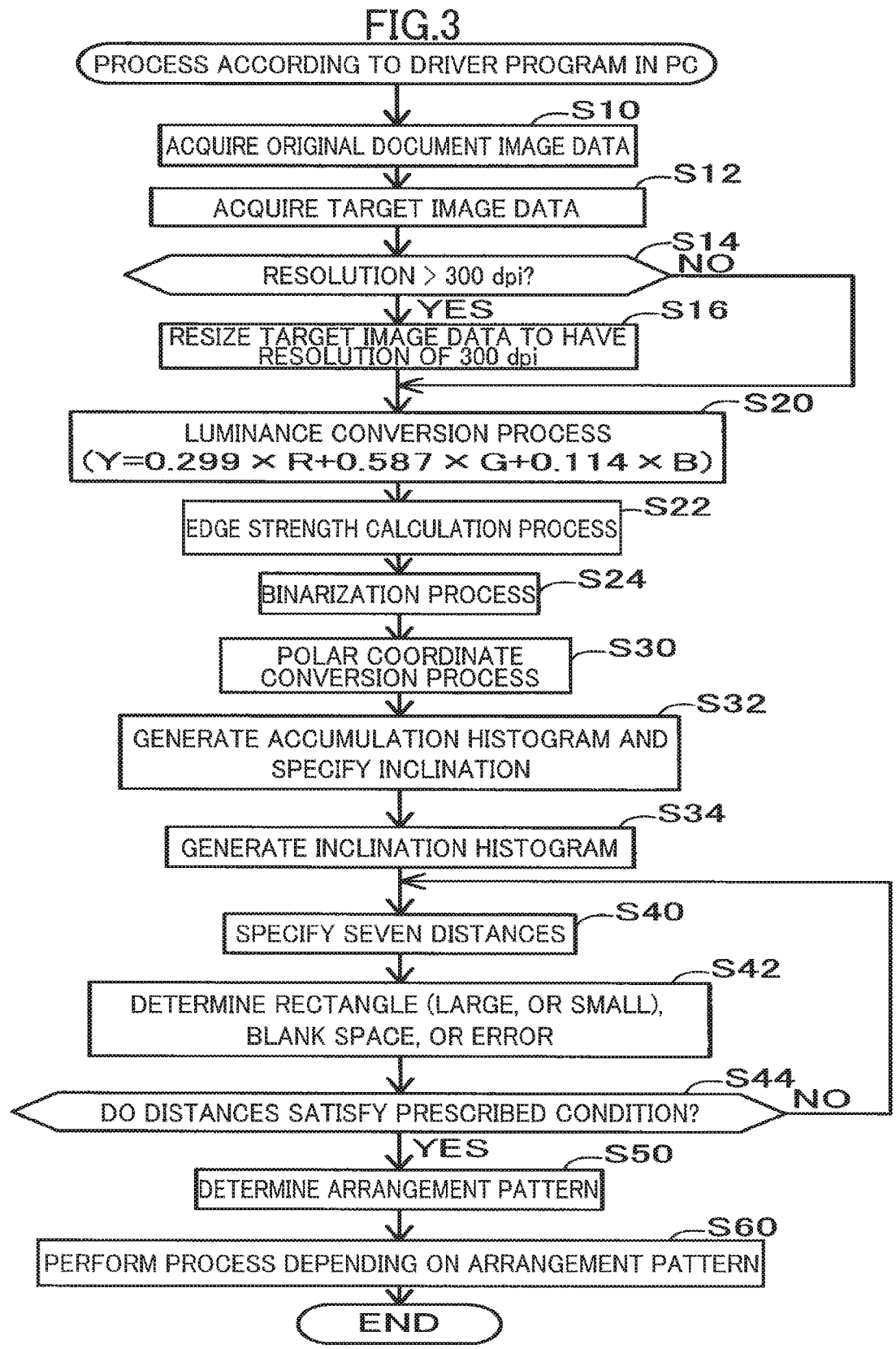
FIG. 3 is a flowchart illustrating a process according to a driver program installed on a PC.

(Process According to Driver Program 134 in PC 100, FIG. 3)

A process performed by the CPU 130 according to the driver program 134 will be explained while referring to FIG. 3.

In S10 the CPU 130 acquires original document image data representing an original document image having a patch code image PCI from the scanner 200 via the network interface 114. More specifically, the user places the original document DC on a tray of the ADF mechanism or the transparent plate of the FB mechanism provided in the scanner 200. The user initiates the driver program 134 using the PC 100, and operates the operation interface 110 so as to provide a scan instruction from the PC 100 to the scanner 200. Accordingly, the scanner 200 scans the original document DC, and the original document image data is transmitted from the scanner 200 to the PC 100. The original document image data includes a plurality of sets of pixel data for respective pixels. Each set of pixel data specifies pixel values (R, G, B values) of 256 gradations (gradations among 0-255). In the embodiment, a lowest resolution that the scanner 200 can handle is 300 dpi. In other words, the original document image data has a resolution higher than 300 dpi.

There is a possibility that a direction in which the longitudinal side of the patch code image PCI extends does not matches a direction in which the longitudinal side of the original document image extends. That is, there is a possibility that the patch code image PCI is tilted in the original document image. One of causes that the patch code is tilted in the original document image is that the patch code PC is tilted while being printed on the sheet. Another is that though the patch code PC is not tilted in the original document, the original document DC is tilted while being scanned. That is, the original document DC is scanned in a state where the original document DC is tilted relative to the transparent plate of the FB mechanism. Or, the original document DC is scanned while the ADF mechanism conveys the original document DC in a tilted state relative to a conveying direction of the ADF mechanism.

In S12 the CPU 130 extracts target image data that is in a prescribed partial area (a target area TA shown in FIG. 2) of the original document image representing a target image TI (FIG. 4), thereby obtaining the target image data. The target image data in the prescribed partial area is a target for the following processes. Comparing with a conceivable case where all the original document image data is a process target, the configuration of the embodiment can reduce the process load. However, all the original document image data may be the process target, as a modification.

Figure 4:
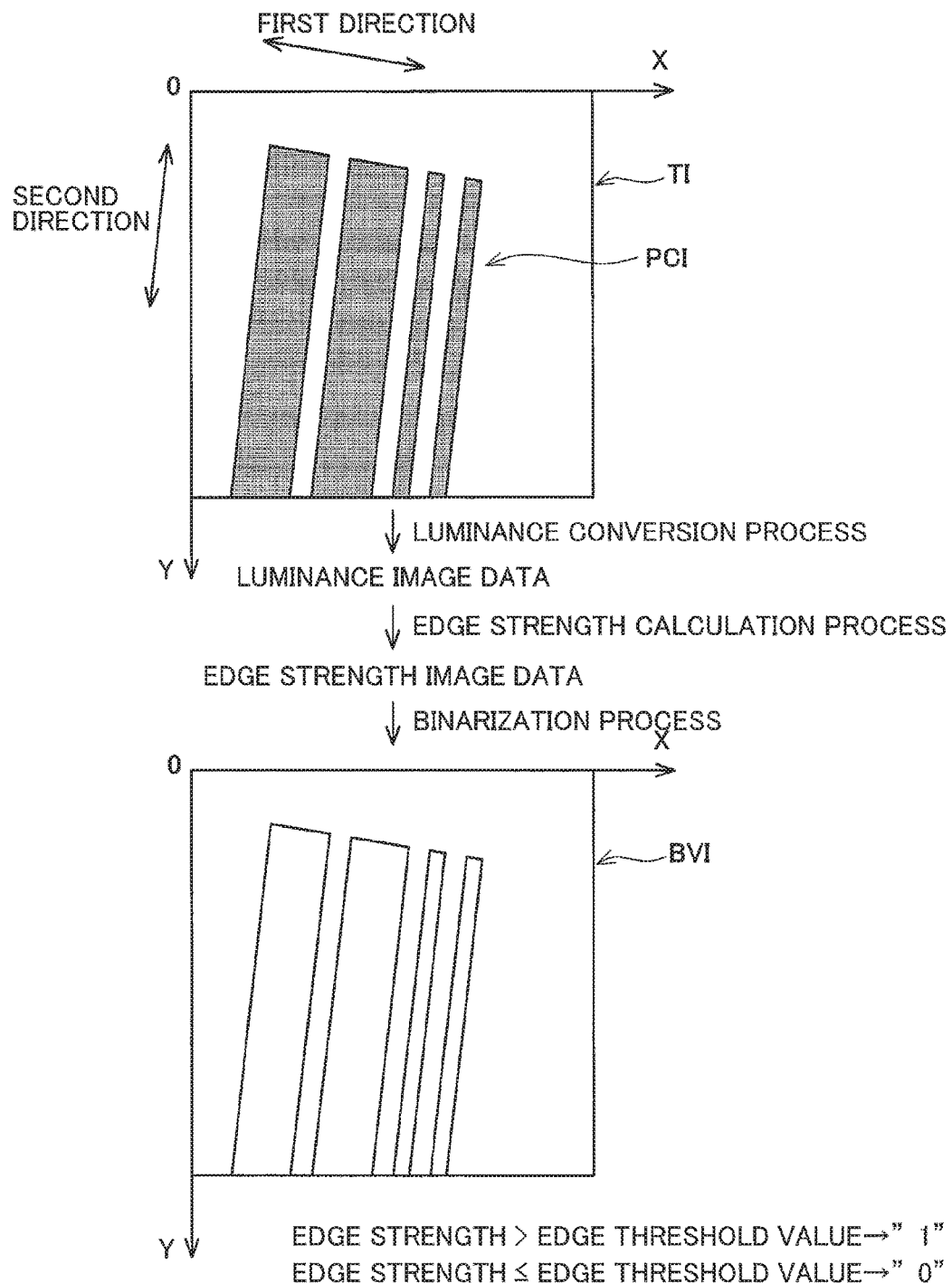
FIG. 4 is an explanatory diagram illustrating examples of a target image and a binary image.

FIG. 4 shows an example of the target image TI. The target image TI represents an image in the target area TA (FIG. 2) in the original document DC. The target area TA is a rectangle region including a left top vertex of the original document DC. The target image TI includes four quadrangle images that are respectively parts of the four rectangles configuring the patch code image PCI. Each quadrangle image is a solid image of black color. Here, a background image of the four quadrangles (or, the background color of the original document) is white color. Each quadrangle includes one short side extending parallel to the first direction, and two longitudinal sides extending parallel to the second direction. In the example shown in FIG. 4, the patch code image PCI is tilted relative to the original document image, a remaining side of each quadrangle image (a side opposing the short side, that is a bottom side in FIG. 4) is not extends parallel to the first direction. The patch code image PCI is represented by an orthogonal coordinate system including X axis and Y axis (hereinafter, referred to as an "XY coordinate system"). The X axis extends parallel to a left right direction of the original document image, and Y axis extends parallel to a vertical direction of the original document image. The X and Y coordinates specify each position of pixels in the patch code image PCI.

In S14 the CPU 130 determines the resolution of the target image data is higher than 300 dpi. When the resolution of the target image data is higher than the 300 dpi (S14: YES), the CPU 130 advances to S16 whereas when the resolution is lower than or equal to 300 dpi (S14: NO), the CPU 130 skips S16 and advances to S20.

In S16 the CPU 130 converts the target image data having the resolution higher than 300 dpi so that converted target image data has a resolution of 300 dpi. That is, the target image data is resized. In the embodiment, the bilinear method is employed for this conversion. However, other methods may be employed. Because of the resize process S16, the process load for following processes can be reduced.

In S20 the CPU 130 performs a luminance conversion process on the target image data. Specifically, the CPU 130 generates a plurality of sets of new pixel data specifying a luminance value (Y value) of 256 gradations among 0-255. Specifically, the CPU 130 convers the pixel values (R, G, and B values) specified by a set of pixel data into the luminance value (Y value) for all of the plurality of sets of pixel data configuring the target image data according to the equation as follows: "Y=0.299×R+0.587×G+0.114×B". Accordingly, the CPU 130 generates luminance image data having the plurality of sets of new pixel data specifying the luminance values.

In S22 the CPU 130 performs an edge strength calculation process on the luminance image data generated in S20. Specifically, the CPU 130 converts a luminance value of a set of pixel data into an edge strength using a Sobel filter for all the plurality of sets of pixel data configuring the luminance image data, and thereby generating a set of new pixel data. Accordingly, the CPU 130 generates edge strength image data having a plurality of sets of new pixel data specifying respectively edge strengths. The CPU 130 may use a first-order differential filter, a second-order differential filter, or a Laplacian filter in order to calculate edge strengths, instead of the Sobel filter.

In S24 the CPU 130 performs a binarization process on the edge strength image data generated in S22. Specifically, the CPU 130 converts an edge strength into one of values "1" and "0" for all the plurality of sets of pixel data configuring the edge strength image data, thereby generating a plurality of sets of new pixel data specifying one of "1" and "0". More specifically, when the edge strength is larger than a threshold value (hereinafter, referred to as an "edge threshold value"), the CPU 130 generates new pixel data specifying the value "1" whereas when the edge strengths is smaller than or equal to the edge threshold value, the CPU 130 generates new pixel data specifying the value "0". Accordingly, the CPU 130 generates binary image data configuring a plurality of sets of new pixel data each specifying one of "1" and "0". Hereinafter, the pixel data specifying "1" and the pixel data specifying "0" are respectively referred to as an "ON pixel data" and an "OFF pixel data".

FIG. 4 shows an example of the binary image BVI represented by the binary image data. In the binary image BVI of FIG. 4, black color indicates an ON pixel represented by the ON pixel data, and white color indicates an OFF pixel represented by the OFF pixel data. Each pixel configuring an outline of each quadrangle is the ON pixel, and each pixel that does not configures the outline is the OFF pixel. That is, an ON pixel is an outline pixel representing an outline of each of the four rectangles.

Returning to FIG. 3, in S30 the CPU 130 performs a polar coordinate conversion process on the binary image data generated in S24 so that the binary image BVI represented by the XY coordinate system is converted into an binary image BVI represented by an polar coordinate system. That is, the CPU 130 converts a coordinate (X, Y) of each ON pixel (outline pixel) into a coordinate (r, θ). Here, "r" and "θ" are values satisfying two equations: "X=r cos θ" and "Y=r sin θ".

Figure 5:
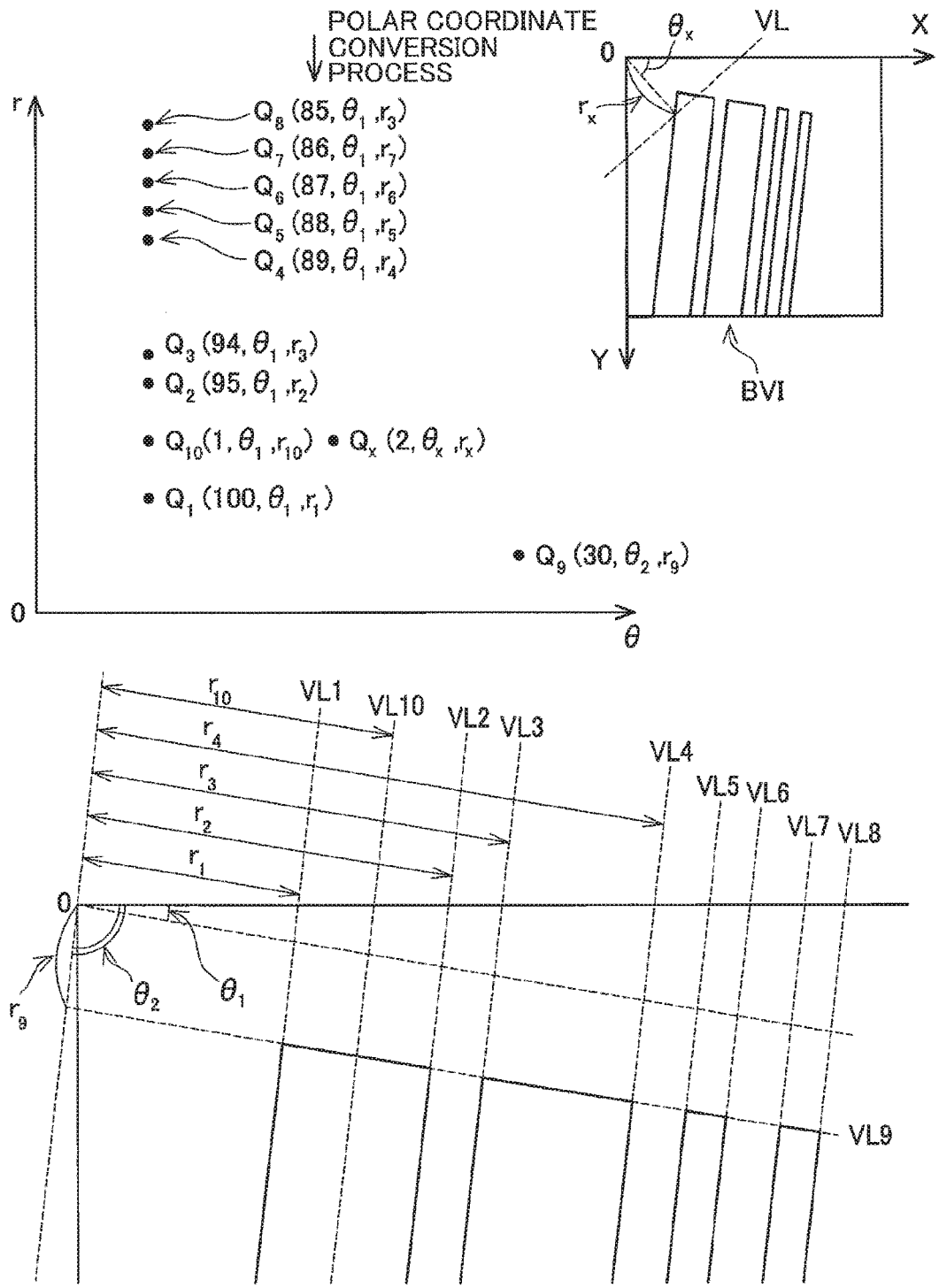
FIG. 5 is an explanatory diagram illustrating a polar coordinate conversion process and virtual straight lines.

In S30 the CPU 130 counts number of ON pixel on each virtual straight line VL by using a plurality of virtual straight lines VL represented by the polar coordinate system. Each virtual straight line VL is virtually arranged on the target image TI. An upper right drawing in FIG. 5 shows one virtual straight line VL. The virtual straight line VL is expressed by the equation "r cos (θ−θ$_x$)=r$_x$". Here, r$_x$ is a distance from an origin O to the virtual straight line VL. The θ$_x$ is an angle of a prescribed straight line from the X axis. The prescribed straight line is orthogonal to the virtual straight line VL and passes through the origin O. The CPU 130 counts or calculates number of ON pixels on the virtual straight line VL. In the example shown in the upper right drawing of FIG. 5, the number of the ON pixels is two. The CPU 130 plots a coordinate Q$_x$ (2 (number of calculated ON pixels), θ$_x$, r$_x$) in the rθ coordinate system having an r axis and a θ axis. An upper left drawing in FIG. 5 shows plotted coordinates Q.

The CPU 130 also calculates number of ON pixels on the respective virtual straight lines VL and plots respective coordinates Q$_j$ (n, θ$_j$, r$_j$) in the rθ coordinate system. Here, "j" is an integer larger than one and specifying one of virtual straight lines VL, "n" is the calculated number of ON pixels, and θ$_j$ and r$_j$ are constant values to specify the virtual straight line VL expressed by the equation "r cos (θ−θ$_j$)=r$_j$". A lower drawing in FIG. 5 shows 10 virtual straight lines VLj among the plurality of virtual straight lines VL (here, j is an integer among 1-10). Each of the virtual straight lines VL1-VL8, and VL10 are defined by an equation "r cos (θ−θ$_1$)=r$_j$". For example, the number of ON pixel is counted (calculated) to one on the virtual straight line VL10, and thus the coordinate Q10 (1, θ$_1$, r$_{10}$) is plotted in the rθ coordinate system (see upper left drawing of FIG. 5). Each of the virtual straight lines VL1-VL8 overlaps with a corresponding longitudinal side of the corresponding quadrangle image. Therefore, many ON pixels are counted on the virtual straight lines VL1-VL8. For example, the calculated number of ON pixels is one hundred on the virtual straight line VL1, and thus the coordinate Q1 (100, θ$_1$, r$_1$) is plotted in the rθ coordinate system (see upper left drawing of FIG. 5). The coordinates Q2-Q8 are plotted similarly. The virtual straight line VL9 is defined by an equation "r cos (θ−θ$_2$)=r$_9$". The virtual straight line VL9 overlaps with short sides of all the quadrangles. Therefore, many ON pixels (30 pixels) are counted on the virtual straight line VL9. Accordingly, the coordinate Q9 (30, θ$_2$, r$_9$) is plotted in the rθ coordinate system (see upper left drawing of FIG. 5). Hereinafter, the number of ON pixels on the virtual straight line VL is referred to as "count number".

In S32 of FIG. 3 the CPU 130 generates an accumulation histogram by using each coordinate plotted in the rθ coordinate system. The CPU 130 specifies, as a target inclination, an inclination of each quadrangle in the target image using the accumulation histogram.

Specifically, the CPU 130 calculates a sum of each of count numbers corresponding to the same angle. Hereinafter, the sum is referred to as an "accumulation value". For example, in the upper left drawing in FIG. 5, nine coordinates Q1-Q8, and Q10 have the same angle θ$_1$. In this case, the CPU 130 calculates the accumulation value by summing all the count numbers corresponding to the angle θ$_1$ (that is, "100", "95", ..., "85", and "1"). Accordingly, the CPU 130 generates a frequency in the histogram corresponding to the accumulation value for the angle θ$_1$. Similarly, the CPU 130 generates frequencies in the histogram respectively corresponding to the accumulation values for remaining angles such as the angle $\theta_2$.

The CPU 130 specifies, as a target inclination, the angle $\theta_1$ corresponding to the maximum accumulation value in the accumulation histogram. The angle $\theta_1$ indicates an inclination of the virtual straight lines VL respectively overlapping with the longitudinal sides of the quadrangles.

The virtual straight lines VL1-VL10 having one of the angles $\theta_1$ and $\theta_2$ are explained as examples. However, other straight lines having angles other than $\theta_1$ and $\theta_2$ may be set, and the target angle $\theta_1$ having a maximum frequency may be specified from among these angles using the accumulation histogram.

According to the embodiment, the inclination of the longitudinal side of each quadrangle (the target inclination) can be properly specified. As described above, because the target inclination is specified by using the r$\theta$ coordinate system, the number of the virtual straight lines VL can be reduced compared to a case where the target angle is specified by using the xy coordinate system. That is, in the xy coordinate system, the virtual line is defined by "y=ax+b", and the inclination "a" can be set from among infinite number of values. On the other hand, in the r$\theta$ coordinate system, the $\theta$ for defining the virtual straight line VL can be set from among 0-360 degrees. Therefore, in the embodiment, process load for specifying the target inclination can be reduced. However, the target inclination may be specified by using the xy coordinate system and without using the r$\theta$ coordinate system, and successive processes may be performed on the basis of the specified target inclination, as a modification.

Figure 7:
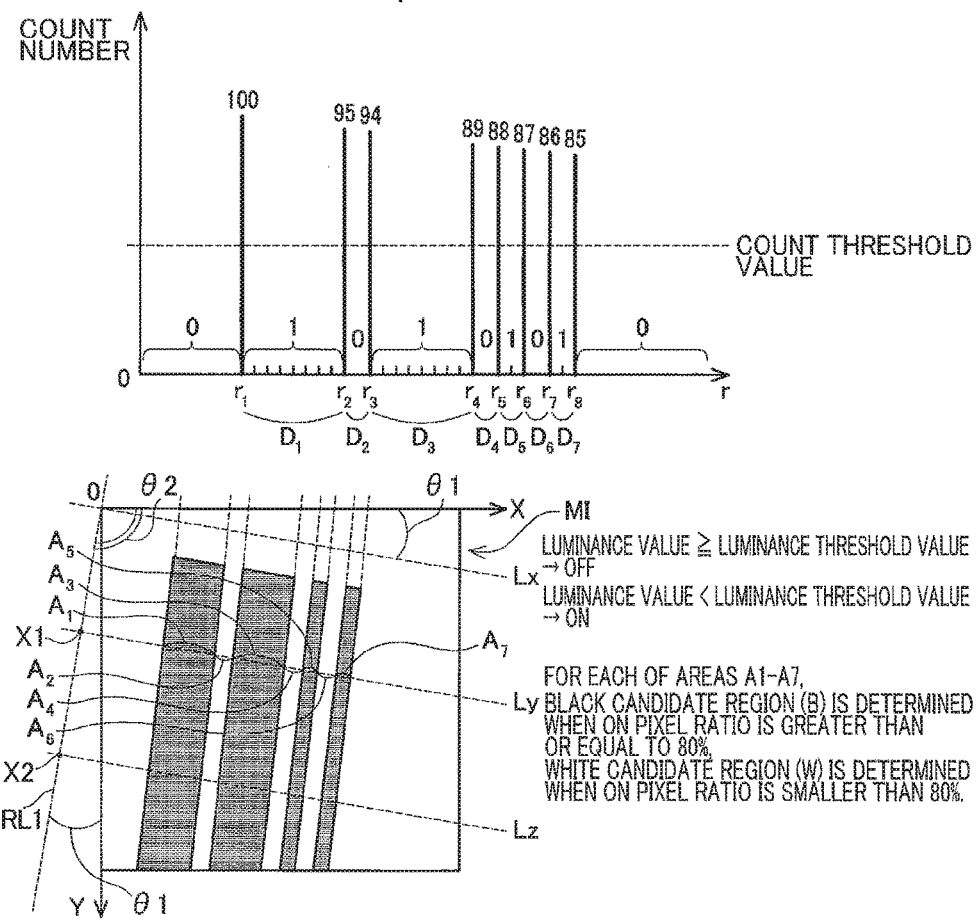
FIG. 7 is an example of an inclination histogram, an explanatory diagram illustrating determination straight lines, and a table for determining a black or white region.

In S34 of FIG. 3 the CPU 130 generates an inclination histogram using a plurality of coordinates plotted in the r$\theta$ coordinate system (see upper left drawing in FIG. 5) and the target inclination specified in S32. Specifically, the CPU 130 specifies at least two of the coordinates Q1-Q8, and Q10 having the target inclination $\theta_1$ from among the plurality of coordinates plotted in the r$\theta$ coordinate system, and generates the inclination histogram correlating the distances $r_j$ and the count numbers (such as 100 or 95) of each specified coordinates. Specifying at least two coordinates Q1-Q8 and Q10 having the target inclination $\theta_1$ are equivalent to specifying at least two virtual straight lines VL1-VL8 and VL10. Upper drawing in FIG. 7 is an example of the inclination histogram.

In S40 of FIG. 3 the CPU 130 specifies seven distances using the inclination histogram generated in S34. Specifically, the CPU 130 specifies the maximum count number in the inclination histogram ("100" in the upper drawing in FIG. 7), and calculates an count threshold value to be half of the maximum count number ("50" in this example). The CPU 130 specifies the distances $r_j$ that are larger than the count threshold value from the inclination histogram (eight distances $r_j$ ($r_1$-$r_8$) in the example). Here, specifying eight distances $r_j$ indicates specifying two straight lines corresponding to two longitudinal sides of a quadrangle for all the four quadrangles. The CPU 130 may specify eight distances $r_j$ in descending order from the maximum count number in the inclination histogram without using the count threshold value.

Using the specified eight distances $r_j$ ($r_1$-$r_8$), the CPU 130 calculates a distance D1 (number of pixels) between the minimum distance $r_1$ from the origin O and the second smallest distance $r_2$. Similarly, the CPU 130 calculates distances Dk (D2-D7) (number of pixels) between the k-th smallest distance (one of the distances $r_j$) and the (k+1)-th smallest distance (another one of the distances $r_j$). Here, "k" is an integer among 2-7.

In S42 of FIG. 3 the CPU 130 classifies each of seven distances D1-D7 specified in S40 into one of the rectangle (large), the rectangle (small), the blank space, and an error. The CPU 130 converts the luminance image data generated in S20 into monochromatic image data representing a monochromatic image MI. Specifically, the CPU 130 performs a conversion described below for all the plurality of sets of pixel data in the luminance image data. The conversion process is performed so that when a luminance value of a set of pixel data is smaller than a prescribed luminance threshold value (that is, the set of pixel data indicates a black color), the CPU 130 converts the set of pixel data into a value "1" whereas when the luminance value of the set of pixel data is larger than or equal to the prescribed luminance threshold value (that is, the set of pixel data indicates a white color), the CPU 130 converts the set of pixel data into a value "0". Accordingly, the CPU 130 generates the monochromatic image data having a plurality of sets of pixel data each indicating one of the values "1" and "0". Hereinafter, the pixel indicating "1" and the pixel indicating "0" are respectively referred to as an "ON pixel" and an "OFF pixel". As shown in a vertical center drawing of FIG. 7, each pixel on or inside of the outlines of the four quadrangles is the ON pixel and each pixel outside of the four quadrangles is the OFF pixel.

The CPU 130 arranges three determination straight lines Lx, Ly, and Lz on the monochromatic image MI (FIG. 7). Each of the determination straight lines Lx, Ly, and Lz intersects with the X axis at an angle $\theta_1$ in the XY coordinate system. The determination straight lines Lx, Ly, and Lz passes through respective prescribed points (the origin O, a point X1, and a point X2) different from each other on a reference straight line RL1. Here, the reference straight line RL1 passes through the origin O and is rotated from the Y-axis in the clockwise direction by the angle $\theta_1$. In other words, the reference straight line RL1 intersects with the determination straight lines Lx, Ly, and Lz with the orthogonal angles. The CPU 130 specifies areas A1-A7 (that is, line segments) on the determination lines Lx, Ly, and Lz using distances $r_1$-$r_8$. Any position in the area A1 is apart from an intersecting point (point O, X1, or X2) between each determination straight line (Lx, Ly, or Lz) and a reference straight line RL1 by a distance within a range between $r_1$ and $r_2$. Any position in the area A2 is apart from an intersecting point (point $\theta$, X1, or X2) between each determination straight line (Lx, Ly, or Lz) and the reference straight line RL1 by a distance within a range between $r_2$ and $r_3$. Remaining areas A3-A7 are specified similarly. In FIG. 7, the areas A1-A7 are indicated on the determination straight line Ly. However, areas A1-A7 are also defined on the determination straight line Lx and Lz. That is, in the embodiment, because there is three determination straight lines Lx, Ly, and Lz, three areas A1 are defined on respective three determination straight lines Lx, Ly, and Lz, and three areas A2 are defined on respective three determination straight lines Lx, Ly, and Lz, for example.

The CPU 130 performs the following processes with respect to all the determination straight lines Lx, Ly, and Lz. For all the areas A1-A7, the CPU 130 calculates an ON pixel ratio (percentage) of the number of ON pixels in the area (A1-A7) to the number of all pixels in the area (A1-A7). The CPU 130 determines whether the ON pixel ratio is greater than or equal to 80%. The CPU 130 identifies a region whose ON pixel ratio is greater than or equal to 80% with a black candidate region. It is quite possible that the black candidate region corresponds to the rectangle (large) or the rectangle (small) representing black color. On the other hand, the CPU 130 identifies a region whose ON pixel ratio is smaller than 80% with a white candidate region. It is quite possible that the white candidate region corresponds to a blank space with a high possibility. For example, with respect to the determination straight lien Lx, all the areas A1-A7 are identified as the white candidate region. With respect to each of the determination straight lines Ly and Lz, the areas A1, A3, A5, and A7 are identified as the black candidate region and the areas A2, A4, and A6 are identified as the white candidate region. Bottom section of FIG. 7 is a table showing which each of the areas A1-A7 is the black candidate region by the symbol "B" or the white candidate region by the symbol "W".

The CPU 130 determines, as a black region, each of the areas A1, A3, A5, and A7 that is identified with the candidate black region on at least one determination straight line (Lx, Ly, and Lz). On the other hand, the CPU 130 determines, as a white region, each of the areas A2, A4, and A6 that is identified with the candidate white region on all of the determination straight lines Lx, Ly, and Lz. As described above, in the embodiment, each of the areas A1-A7 is determined to one of the black region and the white region using the three determination straight lines Lx, Ly, and Lz. In a conceivable case where only the determination straight line Lx is used, all the areas A1-A7 are incorrectly determined as the white region. Because three determination lines Lx, Ly, and Lz are used in the embodiment, each of the areas A1-A7 are correctly determined to one of the black region and the white region.

Figure 8:
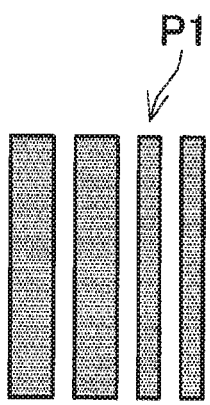
FIG. 8 is an explanatory diagram illustrating an example when determining an arrangement pattern.

As described above, in S40 the distances D1-D7 are identified for the respective areas A1-A7. In S42, each of the areas A1-A7 is determined to one of the black region and the white region. Further, in S42 the CPU 130 determines each of the areas A1-A7 to be any one of the rectangle (large), the rectangle (small), the blank space, and error by using the length data 136. The CPU 130 determines that an area determined as the black region and having a distance of 50-80 pixels is the rectangle (large). The CPU 130 determines that an area determined as the black region and having a distance of 15-35 pixels is the rectangle (small). The CPU 130 determines that an area determined as the white region and having a distance of 15-35 pixels is the blank space. The CPU 130 determines error for an area other than the above areas. As shown in FIG. 8, the CPU 130 determines that the areas A1 and A3 having respective distances D1 and D3 indicate the rectangle (large), the areas A2, A4, and A6 having respective distances D2, D4, and D6 indicate the blank space, and the areas A5 and A7 having respective distances D5 and D7 indicate the rectangle (small).

In S44 of FIG. 3, the CPU 130 determines whether the distances D1-D7 satisfy a prescribed condition including a first condition and a second condition. The first condition is that among the seven distances D1-D7, two distances indicate the rectangles (large) and two distances indicate the rectangles (small). The second condition is that remaining three distances (other than the distances that indicate the rectangle (large) or the rectangle (small) among the seven distances D1-D7) indicate blank spaces. When the distances D1-D7 satisfy the prescribed condition (S44: YES), in S50 the CPU 130 advances to S50. On the other hand, when the distances D1-D7 does not satisfy the prescribed condition (S44: NO), the CPU 130 returns to S40. For example, the target image TI includes an image corresponding to a figure different from both the rectangle (large) and the rectangle (small), in S42 an error is determined to at least one of the seven distances D1-D7, and thus in S44 the CPU 130 makes "NO" determination. In this way, when the patch code image PCI does not conform to standard images (S44: NO), the CPU 130 does not determines the arrangement pattern, that is, does not perform the process S50. After returning to S40, the CPU 130 determines new seven distances so that all of the distance(s) that was determined to have errors among the distances D1-D7 are excluded from the new distances. The details of this process will be explained later.

In S50 the CPU 130 determines an arrangement pattern of the four quadrangles (the type of the patch code PC) using the result of determination in S42. Specifically, the CPU 130 determines one of the arrangement patterns P1-P6 (FIG. 2) on the basis of arrangement of the two rectangle (large) and the two rectangle (small) indicated by the distances D1, D3, D5, and D7. In the example shown in FIG. 8, the distances D1, D3, D5, and D7 respectively indicate the rectangle (large), the rectangle (large), the rectangle (small), and the rectangle (small), and thus the arrangement pattern P1 is determined.

In S60 the CPU 130 performs a process depending on the arrangement pattern determined in S50. Specifically, the CPU 130 specifies a folder corresponding to the arrangement pattern determined in S50 in the memory 132, and stores the original document image data acquired in S10 to the specified folder.

It is conceivable that the patch code is determined without considering inclination of the four quadrangles configuring the patch code. In this conceivable case, a straight line parallel to the X axis is arranged in the monochromatic image MI, and areas, in which ON pixels are continuously arranged on the straight line, (hereinafter, referred to as "ON areas") are successively specified in an ascending order of distances from the origin O to the respective areas, that is, in an order from left to right. Accordingly, the four ON areas are specified. It is determined that each of the four ON areas corresponds to one of the rectangle (large) and the rectangle (small) on the basis of pixels configuring each ON area. Because this conceivable case does not consider the inclinations of the four quadrangles, the number of pixels in the ON areas is longer than a length of a short side of the four quadrangles. Accordingly, there is a possibility that the determination of correspondence between the ON area and one of the rectangle (large) and the rectangle (small) is not precisely made in this conceivable case.

On the other hand, in the embodiment, the PC 100 specifies the target angle $\theta_1$ that indicates the inclination of each of the four quadrangles in the target image TI, and specifies four sets of two straight lines (that is, four pairs of straight lines, or eight straight lines corresponding to $r_1$-$r_8$) by using the inclination $\theta_1$. Further, the PC 100 specifies the distances D1, D3, D5, and D7 each between the two longitudinal sides of the corresponding one of the four quadrangles (S40, and top diagram of FIG. 7). The PC 100 determines a type of the quadrangles to be one of the rectangle (large) and the rectangle (small) using each of the distances D1, D3, D5, and D7 (S42 of FIG. 3, and FIG. 8). That is, the PC 100 can precisely determines the type of the quadrangles from among the rectangle (large) and the rectangle (small) even if each quadrangle is tilted in the target image TI. Accordingly, the PC 100 can precisely determine the type of the patch code PC (S50 of FIG. 3, and FIG. 8).

Figure 9:
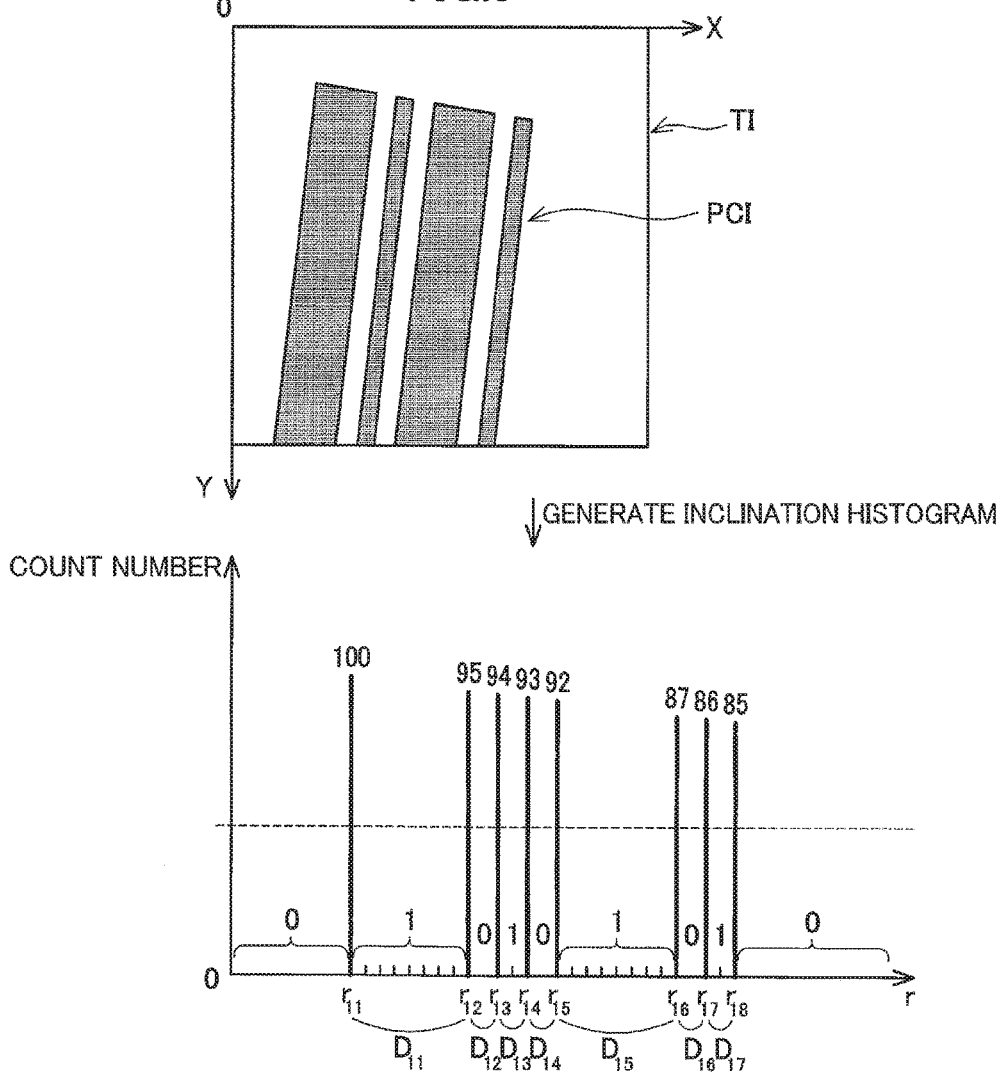
FIG. 9 is an explanatory diagram illustrating an example when determining an arrangement pattern.

(Example of Determining Arrangement Pattern P3, FIG. 9)

An example of determining the arrangement pattern P3 is determined in S30 will be explained while referring to FIG. 9. A top drawing in FIG. 9 is an example of a target image TI having four quadrangles arranged in the arrangement pattern P3. The explanation omits the processes up to S32 where the target inclination is specified.

In a drawing of vertical center in FIG. 9 is an inclination histogram generated in S34. In S40 the CPU 130 determines the distances $r_{11}$-$r_{18}$, and seven distances D11-D17. In S42 the CPU 130 determines that the distances D11 and D15 correspond to the rectangle (large) and the distances D13 and D17 correspond to the rectangle (small). The distances D11-D17 satisfy the prescribed condition, and thus "YES" determination is made in S44. The distances D11, D13, D15, and D17 respectively indicate the rectangle (large), the rectangle (small), the rectangle (large), and the rectangle (small), and thus in S50 the CPU 130 determines the arrangement pattern P3. Accordingly, the PC 100 precisely determines that the four quadrangles are arranged in the arrangement pattern P3 even if the four quadrangles are tilted in the target image TI (S50 of FIG. 3, and a bottom drawing of FIG. 9).

Figure 10:
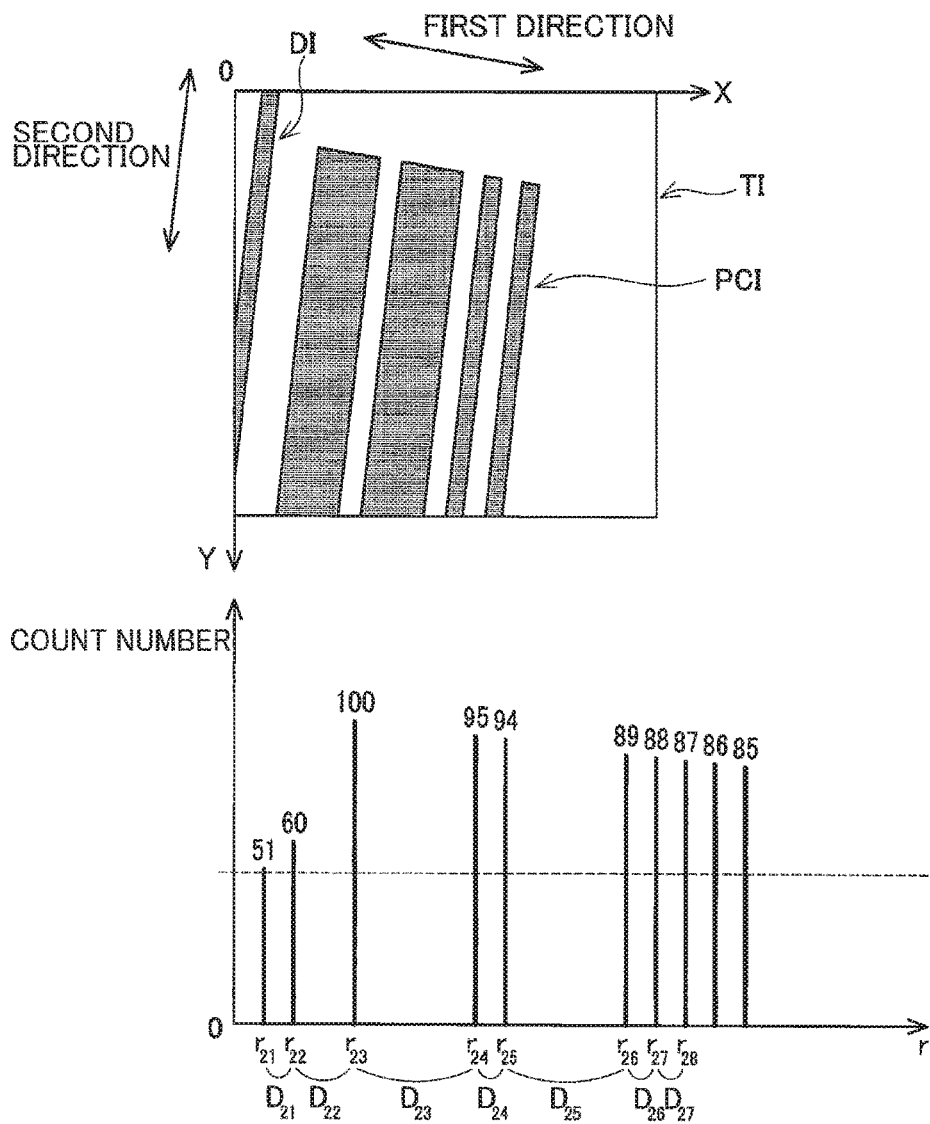
FIG. 10 is an explanatory diagram illustrating an example of procedures when an original document has a smear image.

(Example where Original Document is Smeared, FIGS. 10 and 11)

An example where an original document is smeared will be explained while referring to FIGS. 10 and 11. In this example, "NO" determination is made in S44 in FIG. 3 due to the smear in the original document.

FIG. 10 is an example of a target image TI having a patch code image PCI of the arrangement pattern P1 and a smear image DI indicating smear of black color. The smear image DI includes two longitudinal sides extending parallel to the second direction. A distance between the two longitudinal sides is in a range of 15-35 pixels. Hereinafter, one of the two longitudinal sides in the smear image DI closest to the origin O is referred to as a "near longitudinal side", and remaining one of the two longitudinal sides farthest from the origin O is referred to as a "far longitudinal side". The distance between the smear image DI and one of the four quadrangles closest to the origin is larger than 35 pixels. The explanation omits the process up to S32 where the target inclination is specified.

A drawing of vertical center in FIG. 10 is an inclination histogram generated in S34. In the inclination histogram, there are ten distances $r_j$ having the count number larger than the count threshold value (50), in S40 of FIG. 3 the CPU 130 specifies eight distances $r_j$ ($r_{21}$-$r_{28}$) in an order from left to right, thereby specifying seven distances D21-D27. The distances $r_{21}$ and $r_{28}$ are respectively a distance between the near longitudinal side and the origin O and a distance between the far longitudinal side and the origin O. The distance D21 is a distance between the two longitudinal sides of the smear image DI. The distance D22 is a distance between the smear image DI and one of the four quadrangles closest to the origin O. In S42 the CPU 130 determines that the distance D23 and D25 correspond to the rectangles (large), that the distance D24 and D26 correspond to the blank spaces, and that the distance D27 correspond to the rectangle (small). Because the distance between the two longitudinal sides in the smear image DI is between 15-35 pixels, the CPU 130 determines that the distance D21 corresponds to the rectangle (small). Because the distance D22 is larger than 35 pixels, the CPU 130 determines an error for the distance D22. Because the distance D22 does not correspond to the blank space, that is, the second condition is not satisfied, the CPU 130 makes "NO" determination in S44. Accordingly, the arrangement patterns cannot not be determined, and the process returns to S40.

FIG. 11 is a diagram illustrating a method in which in S40 the CPU 130 specifies new seven distances and subsequently determines the arrangement pattern P1. In the secondly executed S40, the CPU 130 specifies eight distances $r_j$ ($r_{31}$-$r_{38}$) having count numbers larger than the count threshold value excluding two $r_j$ ($r_{21}$ and $r_{22}$) positioned left end among the distances $r_{21}$-$r_{28}$ specified in S40, thereby specifying seven distances D31-D37. On the basis of the specified distances D31-D37, the CPU 130 determines the arrangement pattern P1. Accordingly, the type of the patch code PC is precisely determined even if there is the smear image DI in the target image TI.

It is a conceivable that the CPU 130 does not consider the length of the blank space in S42. In this conceivable case, the CPU 130 incorrectly determines the arrangement pattern P4 (FIG. 2) on the basis of the arrangement of the two rectangle (large) and the two rectangle (small) indicated by the distances D21, D23, D25, and D27 in the example shown in FIG. 10. In the embodiment, the CPU 130 determines an error for the distance D22 considering the length of the blank space, thereby preventing from incorrect determination of the arrangement pattern. However, as a modification, the CPU 130 may not consider the length of the blank space when determining the arrangement pattern.

(Correspondence)

The PC 100 is an example of an image analyzing apparatus. The patch code image, the quadrangle, the ON pixel in S24 of FIG. 3, the edge threshold value, the count threshold value, 15-35 pixels are respectively examples of a code image, a code element, an outline pixel, a prescribed edge strength, a prescribed number, and a prescribed range. The number "4" is an example of the number "N". The longitudinal side of the quadrangle and the short side of the quadrangle are respectively examples of a first side and a second side. The count number, and the accumulation value are respectively examples of first number and second number. The XY coordinate system, the rθ coordinate system, the θ axis are respectively examples of a first coordinate, a second coordinate, an axis representing an inclination of a straight line. The vertical straight lines VL1-VL8 and VL10 are examples of a plurality of virtual straight lines. The arrangement patterns P1-P6 are examples of a prescribed pattern.

While the disclosure has been described in detail with reference to the above embodiments, it would be apparent to those skilled in the art that various changes and modifications may be made therein.

Modification 1

In the embodiment, all of the outline pixels are ON pixels in the binary image BVI shown in FIG. 4 according to S24. However, in the modification 1, only a part of the outline pixels may be ON pixels. In S32 the target inclination can be specified only if at least two pixels on one longitudinal side of the quadrangle are ON pixels. Further, in S40 the seven distances can be specified only if at least one pixel of each longitudinal side for all four quadrangles is an ON pixel, that is, only if at least eight pixels located on respective longitudinal sides are ON pixels. Generally, only if 2N number of outline pixels that configure respectively N number of code elements (patch codes) are specified, N number of distances D can be specified. That is, specifying the outline pixels may specify only a part of the outline pixels configuring the outline of the code element (patch code).

Modification 2

A code element of the patch code may not have a quadrilateral shape, or may not have short side. For example, the code element (the patch code) may have one curved side. Generally, the code element of the patch code may have only to include two sides (straight line segment, or straight line portion) extending parallel to the second direction.

Modification 3

In the embodiment, there are six types of the patch code PC. However, the original document to be scanned may have a prescribed code configured of four quadrangles having the same shape. In this case, in S42-S50 the CPU 130 determines whether the original document includes the prescribed code. Further, in S60 the CPU 130 stores the original image data in the first folder when the original document includes the prescribed code whereas the CPU 130 stores the original document in the second folder when the original document does not includes the prescribed code. That is, N number of code elements (the patch codes) may not include two or more types of four quadrangle image.

Modification 4

The procedures described above is applicable to a case where an original document having a bar code is scanned. In this case, a plurality of quadrangle images configuring the bar code corresponds to the N number of code elements (quadrangle images). In this case, through S40-S50 the CPU 130 specifies numerals indicated by the quadrangles (corresponding to the distances $r_j$), in S60 CPU 130 performs a process depending on a combination of the specified numerals (for example, the process for storing the original image in the folder corresponding to the combination).

Modification 5

In S32 the CPU 130 may specify a target inclination without generating the accumulation histogram. Specifically, the CPU 130 may specify a coordinate having the maximum count number (the coordinate Q1 in the top drawing in FIG. 5), and may specify an inclination θ ($θ_1$ in the embodiment) in the specified coordinate. That is, specifying the inclination may not calculate second number (accumulation number).

Modification 6

Figure 6:
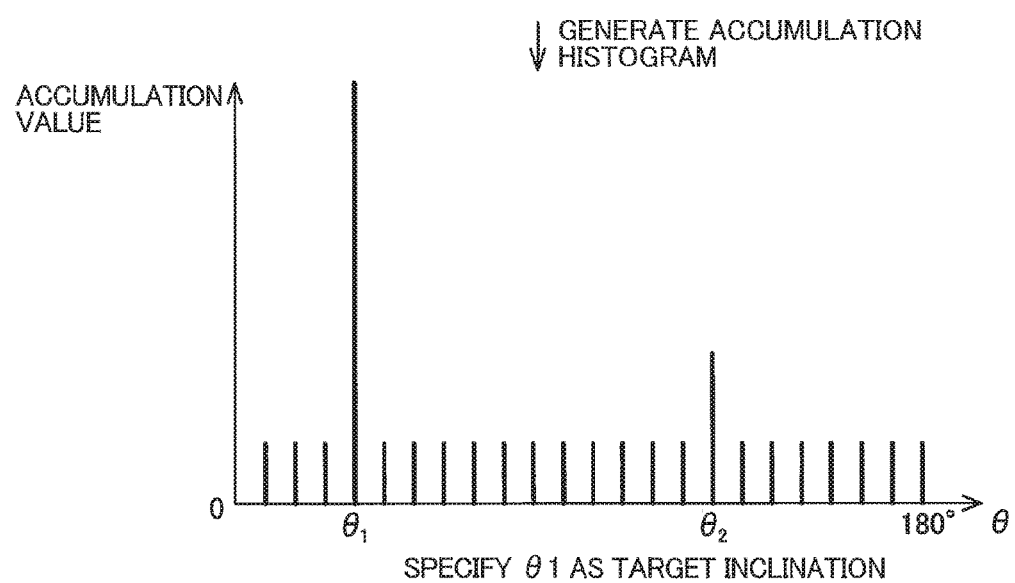
FIG. 6 is an example of an accumulation histogram according to the embodiment.

In S32 the CPU 130 may specify, as the target inclination, an inclination θ ($θ_2$ in the embodiment, FIG. 6) corresponding to second largest accumulation value, instead of specifying an inclination θ ($θ_1$ in the embodiment, FIG. 6) corresponding to largest accumulation value. In this case, in S34 the CPU 130 may use a value ($θ_1$ of FIG. 6) subtracting 90° from the target inclination when generating the inclination histogram. That is, the target inclination may not be an inclination having one side of N pairs of two sides (longitudinal sides, in the embodiment).

Modification 7

Each step in FIG. 3 may be performed by the scanner 200. In S60 the original image data may be stored in a folder in the scanner 200. That is, the image analyzing apparatus may be a scanner. Generally, the image analyzing apparatus may be any apparatus configured to perform an image analysis such as a multifunction peripheral and a smartphone.

In the embodiment, each process of FIGS. 3-11 are performed by executing the driver program 134 (that is, software) by the CPU 130. Alternatively, at least one of processes of FIGS. 3-11 may be achieved by hardware such as logical circuit.

Each technical element explained above or explained in the drawings exhibit technical advantages by oneself or any combination with one or more of technical elements also explained above or explained in the drawings, and thus it is not the case that only combinations of technical elements recited in as filed claims exhibit technical advantages. The technique described above or explained in the drawings accomplishes a plurality of object at a time, and has technical advantages when at least one object is accomplished.

What is claimed is:

1. An image analyzing apparatus comprising a processor comprising hardware, the processor configured to perform:

acquiring target image data representing a target image having a code image, the code image including N number of code elements arranged in a first direction where N is an integer equal to or greater than 2, each of the N number of code elements having two first sides parallel to a second direction orthogonal to the first direction, the target image data having a plurality of target image pixels;

specifying outline pixels configuring respective outlines of the respective N number of code elements from among the plurality of target image pixels; specifying a target inclination by analyzing the outline pixels, the target inclination indicating an inclination of the N number of code elements in the target image;

specifying N number sets of two target straight lines for the respective N number of code elements using the outline pixels and the target inclination, each of the N number sets of two target straight lines corresponding to two first sides of corresponding one of the N number code elements;

specifying first distances for the respective N number of code elements by specifying second distances for the respective N number sets of two target straight lines, each of the first distances being between two first sides included in corresponding one of the N number of code elements, each of the second distances being between corresponding one set among the N number sets of two target straight lines; and determining a representation form of the code image using the first distances for the respective N number of code elements regardless of whether the code image is tilted in the target image.

2. The image analyzing apparatus according to claim 1, wherein each of the N number of code elements has a quadrilateral shape, wherein each of the N number of code elements has at least one second side extending in the first direction, wherein the N number of code elements include at least two types of quadrangle images different in second side length, wherein the specifying first distances includes specifying a length of the at least one second side of each of the N number of code elements, the length representing a distance between two first sides of corresponding one of the N number of code elements, wherein the determining determines the representation form of the code image by determining a type of each of the N number of code elements from among the at least two type of the quadrangle images using the specified lengths of the N number of code elements.

3. The image analyzing apparatus according to claim 1, wherein the specifying outline pixels includes calculating a plurality of edge strengths for respective ones of the plurality of target pixels,
   wherein the specifying outline pixels specifies, as the outline pixels, specific target pixels having respective edge strengths larger than a prescribed edge strength among the plurality of target pixels.

4. The image analyzing apparatus according to claim 1, wherein the specifying a target inclination includes:
   calculating first numbers for respective ones of a plurality of virtual straight lines virtually arranged in the target image, each of the first numbers indicating number of the outline pixels on corresponding one of the plurality of virtual straight lines, the plurality of virtual straight lines being inclined at an inclination among at least two inclinations in the target image; and
   calculating second numbers for the respective at least two inclinations using the first numbers, each of the second numbers being number of the outline pixels on at least one of the plurality of virtual straight lines having corresponding one of the at least two inclinations,
   wherein the specifying a target inclination specifies, as the target inclination, an inclination, for which a largest second number is calculated among the second numbers, from among the at least two inclinations.

5. The image analyzing apparatus according to claim 4, wherein the specifying outline pixels is performed using a first coordinate system configured of axes that do not represent any inclination of straight lines,
   wherein the target inclination is specified by performing the calculating first numbers and the calculating second numbers using a second coordinate system different from the first coordinate system, the second coordinate system including an axis representing an inclination of a straight line.

6. The image analyzing apparatus according to claim 4, wherein the specifying N number sets of two target straight lines includes:
   specifying at least two of the plurality of virtual straight lines having the target inclination; and
   specifying, as the N number sets of two target straight lines, 2N number of virtual straight lines for which the respective first numbers larger than a prescribed number are calculated among the at least two of the plurality of virtual straight lines.

7. The image analyzing apparatus according to claim 6, wherein the specifying outline pixels is performed using a first coordinate system configured of axes that do not represent any inclination of straight lines,
   wherein the N number sets of two target straight lines is specified by performing the specifying at least two of the plurality of virtual straight lines using a second coordinate system different from the first coordinate system, the second coordinate system including an axis representing an inclination of a straight line.

8. The image analyzing apparatus according to claim 1, wherein the specifying a target inclination specifies, as the target inclination of the N number of code elements, an inclination of the two first sides that are included in the N number of the code elements and are parallel to the second direction,
   wherein the specifying N number sets of two target straight lines for the respective N number of code elements specifies, using the outline pixels and the target inclination, each of the N number sets of two target straight lines that has the target inclination and corresponds to two first sides of corresponding one of the N number of code elements.

9. The image analyzing apparatus according to claim 1, wherein the specifying first distances specifies, as a first distance between two sides included in an M-th code element counted from one side of the first direction among the N number of code elements, a second distance between a (2M−1)-th target straight line and a 2M-th target straight line, the (2M−1)-th target straight line and the 2M-th target line being counted from the one side of the first direction among the N number sets of two target lines, where M is an integer larger than or equal to one and smaller than or equal to N.

10. The image analyzing apparatus according to claim 1, wherein the processor is configured to further perform:
   specifying, as (N−1) number of lengths of blank spaces, each of the (N−1) number of lengths of blank spaces between a 2L-th target straight line and a (2L+1)-th target straight line for all integer L larger than or equal to one and smaller than N, the 2L-th target straight line and the (2L+1)-th target straight line being counted from one side of the first direction among the N number sets of two straight lines;
determining that N number of code elements constitute a prescribed pattern on a basis of the determined representation form when each of the (N−1) number of lengths of blank spaces is within a prescribed range; and
determining that N number of code elements do not constitute the prescribed pattern when at least one of the (N−1) number of lengths of blank spaces is out of the prescribed range.

11. The image analyzing apparatus according to claim 1, wherein the target image data is acquired by extracting from original image data the target image data representing the target image in a prescribed region in an original document image.

12. A non-transitory computer readable storage medium storing a set of program instructions installed on and executed by a computer, the set of program instructions comprising:
   acquiring target image data representing a target image having a code image, the code image including N number of code elements arranged in a first direction where N is an integer equal to or greater than 2, each of the N number of code elements having two first sides parallel to a second direction orthogonal to the first direction, the target image data having a plurality of target image pixels;
   specifying outline pixels configuring respective outlines of the respective N number of code elements from among the plurality of target image pixels;
   specifying a target inclination by analyzing the outline pixels, the target inclination indicating an inclination of the N number of code elements in the target image;
   specifying N number sets of two target straight lines for the respective N number of code elements using the outline pixels and the target inclination, each of the N number sets of two target straight lines corresponding to two first sides of corresponding one of the N number code elements;
   specifying first distances for the respective N number of code elements by specifying second distances for the respective N number sets of two target straight lines, each of the first distances being between two first sides included in corresponding one of the N number of code elements, each of the second distances being between corresponding one set among the N number sets of two target straight lines; and determining a representation form of the code image using the first distances for the respective N number of code elements regardless of whether the code image is tilted in the target image.

\* \* \* \* \*